C. LOEB.

Scarf.

No. 8,322. Reissued July 9, 1878.

Witnesses
John Becker
Fritz Wagner

Inventor:
Charles Loeb
by his Attorneys
Brown & Allen

N. PETERS, PHOTO-LITHOGRAPHER, WASHINGTON, D. C.

UNITED STATES PATENT OFFICE.

CHARLES LOEB, OF NEW YORK, N. Y.

IMPROVEMENT IN SCARFS.

Specification forming part of Letters Patent No. 177,136, dated May 9, 1876; Reissue No. 8,322, dated July 9, 1878; application filed May 14, 1878.

*To all whom it may concern:*

Be it known that I, CHARLES LOEB, of the city, county, and State of New York, have invented a new and useful Improvement in Scarfs, of which the following is a description, reference being had to the accompanying drawings, forming part of this specification.

In made-up scarfs for men's wear the upper edge or part of the front of the scarf which comes in contact with the throat or beard of the wearer becomes badly worn or soiled, while other parts are scarcely impaired in appearance or usefulness.

The object of this invention is to render such scarfs more durable; and to this end it consists in the combination, with the flaps of the scarf, of a center-piece detached from and movable between and independently of the flaps, in a manner to provide for changing its upper surface, which is exposed to the throat or beard.

The accompanying drawings, illustrating my invention, represent it applied to a scarf of the kind known as "Lord Stanley's Scarf."

Figure 1:
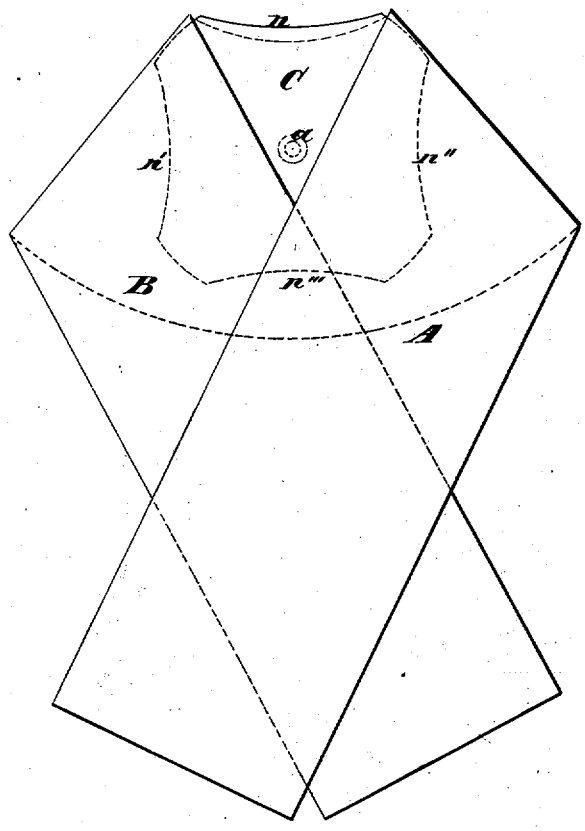
Figure 2:
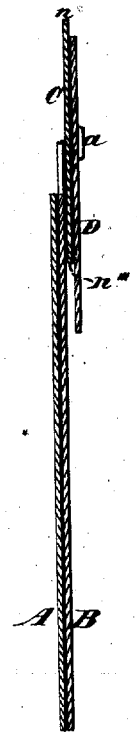

Figure 1 is a front view, and Fig. 2 a central vertical section.

A and B are the two flaps, folded over each other, and attached to a back piece, D, in the usual manner. C is the center-piece, which is usually secured permanently to the flaps, but which I make detached from and independent of the latter. This center-piece is represented as made of an approximately square shape, and attached by means of a central stud or button, *a*, to the back piece D in such a manner that it can be turned on said stud or button *a* so as to bring either side to the top, the other sides being at the same time concealed behind the flaps. The sides *n n′ n″ n‴* are shown as slightly curved to fit the shape of the neck; but they may be made straight. The corners are also shown as cut off, so as to fit within the upper parts of the interiors of the flaps.

Instead of the center-piece C being made of a square shape, it may be made triangular or of other polygonal form.

When the upper edge of the center-piece C is worn or soiled the center-piece is turned on the pivot *a*, to bring another side upward and place the worn edge out of sight.

What I claim as my invention is—

1. The combination, with the flaps of a scarf, of a center piece secured and movable between, under, or behind, and independently of the flaps, to provide for changing its wearing-surface, substantially as herein described and shown.

2. The polygonal center-piece attached to the back part of the scarf by means of a pivot, upon which it may be turned, substantially as and for the purpose herein described.

CHAS. LOEB.

Witnesses:

HENRY T. BROWN,

T. J. KEANE.